C. N. WATERHOUSE.
WOOD WHEEL.
APPLICATION FILED APR. 25, 1921.
1,387,568. Patented Aug. 16, 1921.
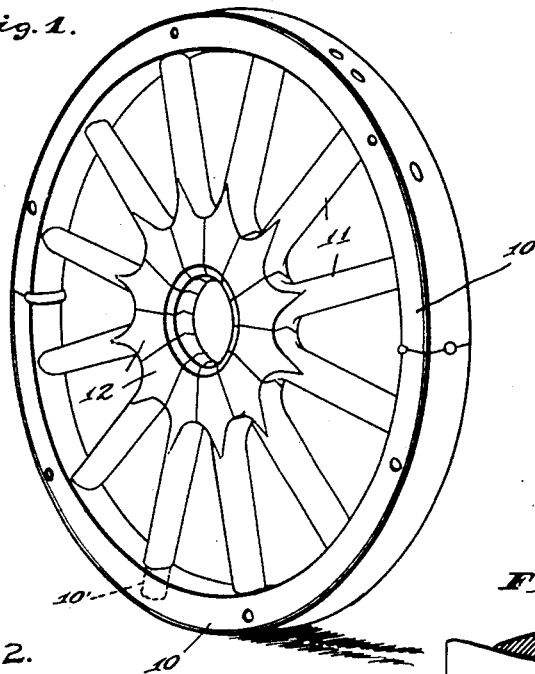
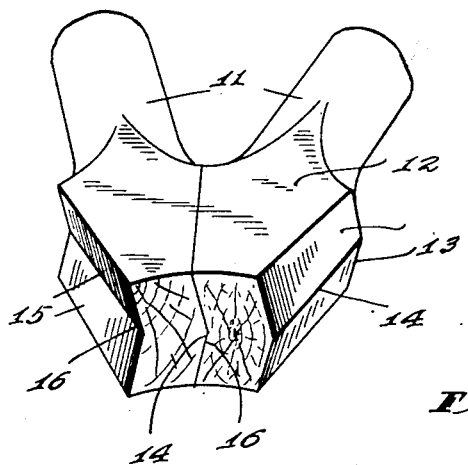
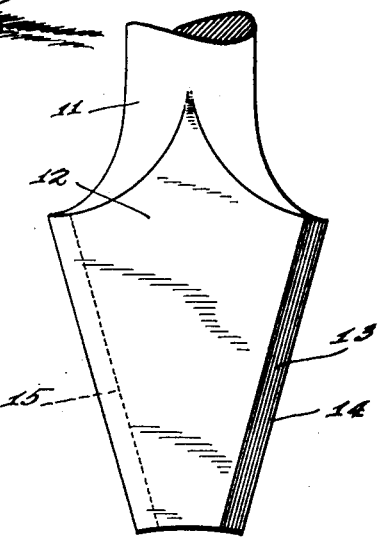
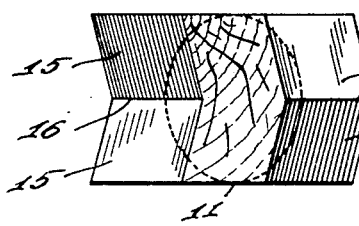
Inventor
Charles Nahum Waterhouse,
By Hood & Schley,
Attorney

UNITED STATES PATENT OFFICE.

CHARLES NAHUM WATERHOUSE, OF MUNCIE, INDIANA.

WOOD WHEEL.

1,387,568.  Specification of Letters Patent.  Patented Aug. 16, 1921.

Application filed April 25, 1921. Serial No. 464,376.

*To all whom it may concern:*

Be it known that I, CHARLES N. WATERHOUSE, a citizen of the United States, residing at Muncie, in the county of Delaware and State of Indiana, have invented a new and useful Wood Wheel, of which the following is a specification.

In the manufacture of wooden wheels, comprising wood or metal fellies and wooden spokes, especially for automobiles, the inner ends of the spokes are not associated with a hub structure in the process of manufacture, but such hub structure is associated with the spokes at a later period and generally by the automobile manufacturer, the wheel manufacturer producing as a distinct article of commerce, a hubless structure. Such wheels are stored for considerable periods, in many instances and, owing to variations in storage conditions it is not at all unusual for shrinkages to occur in the spokes as to cause separation at their ends, the arch originally formed by the inner ends of the spokes becoming broken by such shrinkages. Almost inevitably, under such conditions, there is more or less warping of the spokes axially of the wheel and, when the spokes are swelled back to their initial position, they do not properly register with each other at their inner ends and difficulty is experienced in assembling the usual metal hub structure preparatory to use in the automobile.

The object of my present invention is to provide a spoke construction, in wheels of the type described, of such character that the spokes will be interlocked with each other axially of the wheel in such manner that if and when the arch is broken by shrinkage or otherwise and the spokes are again swelled, they will automatically reassemble in proper arch form and without axial off-set.

The accompanying drawings illustrate my invention. Figure 1 is a perspective view of a completed wheel blank comprising felly sections, spokes, and a retaining metal band; Fig. 2 is a fragmentary perspective of the inner ends of two adjacent spokes; Fig. 3 is a plan of the inner end of a spoke and Fig. 4 an end elevation.

In the drawings, 10 indicates the felly provided with radial openings 10' (dotted lines) of usual form in order to receive the usual tenons formed at the outer ends of spokes 11. As is usual in wheels of this general type, the inner ends of the spokes are formed into an arrow head portion 12. Generally heretofore, it has been customary to form the radial sides of heads 12 by plain surfaces substantially parallel with the axis of the wheel, although it has not been uncommon to incline said surfaces slightly relative to the wheel axis so as to provide a proper "dishing" of the wheel.

In my construction, the radial faces of the arrow head are formed at one side of each spoke by the diverging surfaces 13, 13 forming a ridge 14, and at the other side by the diverging surfaces 15, 15 forming a valley 16, the ridge 14 of one spoke accurately fitting the valley 16 of the adjacent spoke. The surfaces 13, 13 and 15, 15 are inclined to each other by such an amount that pressure exerted by one spoke upon another will produce a slipping axially of the wheel, which will cause the ridge of one spoke to fully set within the valley of its adjacent spoke. In practice, I have found that these surfaces 13 and 15 should be of substantial extent in order that they may have proper coöperative effect and in order that there may be no shearing of the material of the spoke. While the precise dimensions do not form the essence of my invention, I have found by experiment it is more satisfactory to form the spoke so that there will be but a single ridge or corresponding valley upon any radial face of the spoke and that the angle of any surface 13 or 15 relative to the line connecting the bases of the two surfaces is approximately one-eighth of an inch to the inch.

It will, of course, be understood that in fabricating wheels of this type, the usual methods of assembling are followed, *i. e.*, the spokes are driven outwardly into the perforations in the fellies, the fellies being approximately semi-circular, although of slightly larger radius than the desired radius of the wheel. The two semi-circular fellies with their assembled spokes are then brought together in a press under such conditions that the arrow head ends of the spokes are firmly pressed together and held under heavy compression until the retaining band is shrunk on the outside of the felly.

After a wheel has been produced in accordance with my improved construction, it is found that if this wheel is stored in an inclosed place warmed by artificial heat the spokes may in time shrink so as to break the arch formed by the inner ends of the spokes and that some of the spokes may become displaced at their inner ends axially of the wheel, but as soon as this wheel is subjected to the natural atmosphere, the spokes will absorb moisture and swell back to their normal and initial position, the axially displaced inner ends slipping upon their adjacent spokes and becoming accurately centered by reason of the coöperation between the ridge-surfaces 13, 13 and the valley-surfaces 15, 15, so that the metal hub structure, for which the wheel has been designed, may be readily assembled in position.

It will, of course, be understood, by any one familiar with the art of wheel making, that any desired "dishing" of the wheel may be obtained by so forming the surface pairs 13, 13 and 15, 15, that the splines connecting the outer ends of said pairs will be properly inclined to the wheel axis.

I claim as my invention:

As an article of manufacture, a wheel comprising felly and spokes united at their inner wedge ends into an arch, the radial faces of said wedge ends being coöperatively mated by divergent surfaces serving to determine axial position of the inner ends of the spokes when the same are mated into a circular arch, the said divergent surfaces being at such angle to each other that the wedge ends will slip upon each other axially to proper position.

In witness whereof, I CHARLES N. WATERHOUSE have hereunto set my hand at Muncie, Indiana.

CHARLES NAHUM WATERHOUSE.

Witnesses:
 THOS. J. TULLY,
 GRACE McDONALD.